United States Patent
Usui et al.

(10) Patent No.: US 6,763,038 B1
(45) Date of Patent: Jul. 13, 2004

(54) LIGHT TRANSMISSION EQUIPMENT

(75) Inventors: Nobuhiko Usui, Fukuoka (JP); Koji Matsunaga, Fukuoka (JP); Masayuki Maehira, Fukuoka (JP); Tatsuya Toyozumi, Fukuoka (JP); Yumiko Ogata, Fukuoka (JP); Masahiro Shioda, Kanagawa (JP); Atsuki Taniguchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/536,524

(22) Filed: Mar. 28, 2000

(30) Foreign Application Priority Data

Aug. 11, 1999 (JP) ............................................ 11-227645

(51) Int. Cl.[7] .............................. H04B 10/12; H04J 3/06; H04J 14/00
(52) U.S. Cl. ........................ 370/506; 370/516; 375/362; 375/371; 398/101; 398/155
(58) Field of Search ................................. 370/357, 360, 370/366, 465, 466, 467, 503, 509, 511, 512, 513, 514, 516, 517, 506, 518; 375/365, 366, 368, 362, 371; 398/52, 53, 58, 98, 102, 101, 154, 155, 156, 158, 161

(56) References Cited

U.S. PATENT DOCUMENTS

| 5,710,774 | A | * | 1/1998 | Suh et al. ................... 370/513 |
| 5,751,720 | A | * | 5/1998 | Uematsu et al. ............ 370/503 |
| 6,011,802 | A | * | 1/2000 | Norman ...................... 370/466 |
| 6,041,043 | A | * | 3/2000 | Denton et al. .............. 370/254 |
| 6,058,119 | A | * | 5/2000 | Engbersen et al. ......... 370/466 |
| 6,094,737 | A | * | 7/2000 | Fukasawa ................... 714/38 |

* cited by examiner

Primary Examiner—Alpus H. Hsu
(74) Attorney, Agent, or Firm—Katten Muchin Zavis Rosenman (57) ABSTRACT

In a light transmission equipment which can generate a desired concatenation signal from a maximum concatenation signal standardized in a synchronous transmission mode, a master and a slave circuit for clock change are provided respectively inputting at least two data at a maximum transmission rate based on a concatenation standard of a synchronous transmission mode obtained by dividing a desired transmission rate not prescribed in the concatenation standard to perform a concatenation control to the slave circuit by control information from the master circuit side.

7 Claims, 12 Drawing Sheets

LIGHT TRANSMISSION EQUIPMENT

BACKGROUND OF THE INVENTION

1. Field of the Invention

The present invention relates to a light transmission equipment, and in particular to a clock change circuit used for a light transmission equipment for realizing a concatenation of synchronous transfer signals (STS) used in a synchronous transmission mode (STM).

In a recent light transmission equipment, a data communication technique such as the Internet or the like is required for enhancing a working efficiency of a single signal shared with many people. Also, a transmission function of STS-48 (2.4 Gb/s) data by the synchronous transmission mode for accommodating the Internet signal whose signal rate is improving is required for the improvement of services.

2. Description of the Related Art

Figure 8:
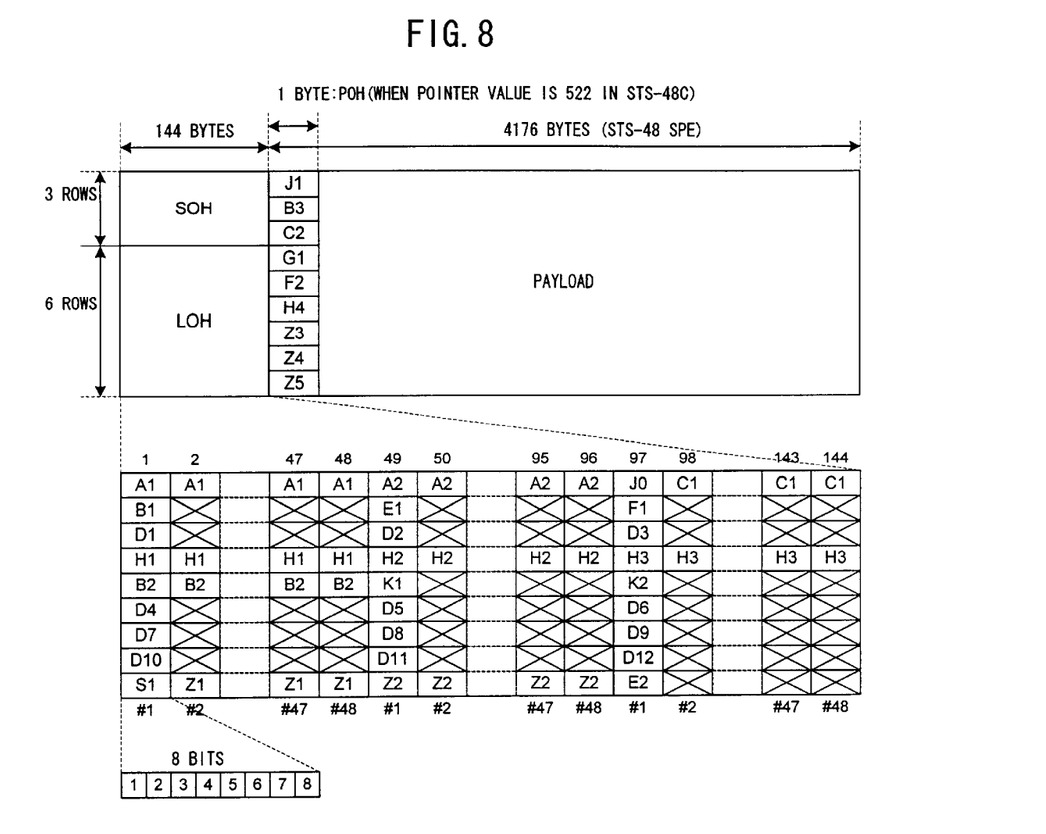
FIG. 8 is a generally known frame format diagram of STS-48 data.
Figure 9:
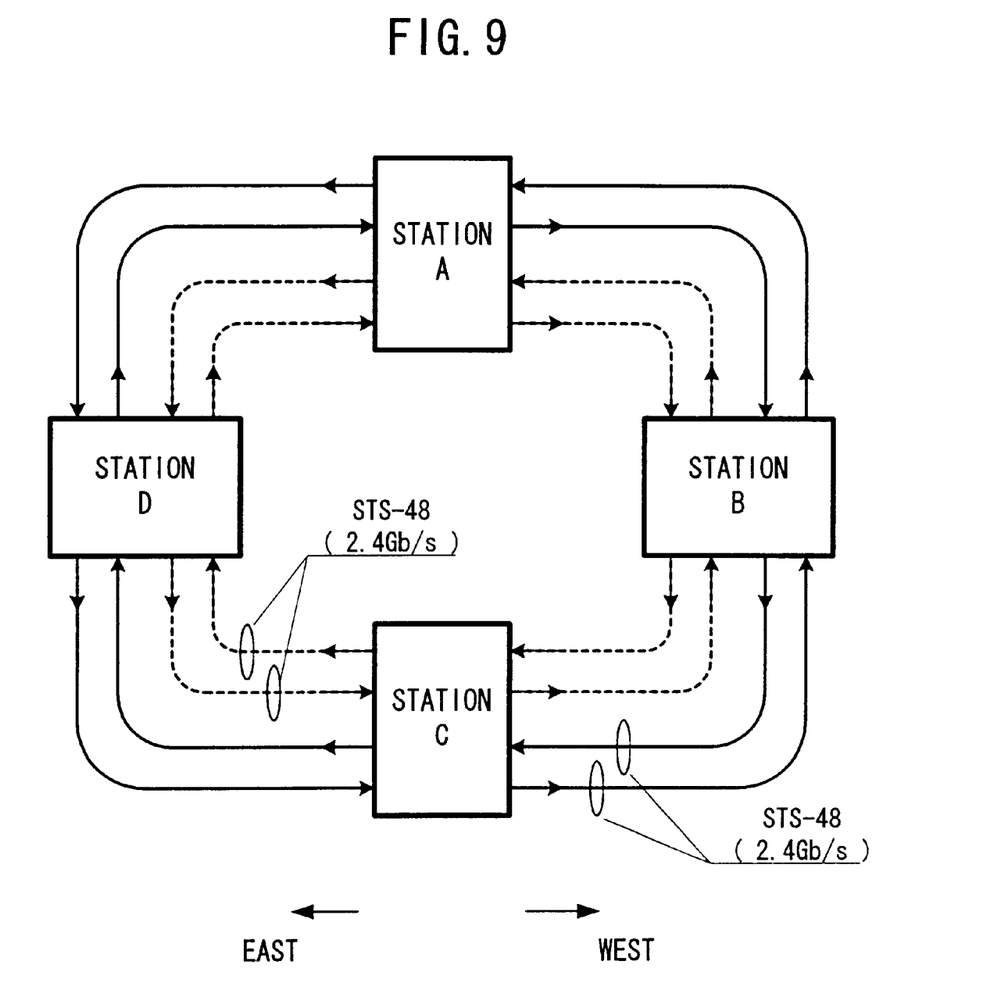
FIG. 9 is a diagram showing a light transmission system where each optical fiber flows therethrough STS-48 data.

The above-mentioned STS-48 data have a frame format as shown in FIG. 8, and a system diagram in which a light signal transmission is performed by using such STS-48 data is shown in FIG. 9.

Such a light transmission system forms a 4F-BLSR (4 Fiber-Bidirectional Line Switched Ring) system where stations A–D respectively forming a light transmission equipment are mutually connected with four optical fibers.

The STS-48 (2.4 Gb/s) data flow through each of the four optical fibers, which are shown by solid lines used as work or active lines (WK) and by dotted lines used as protect or standby lines (PT).

Figure 10:
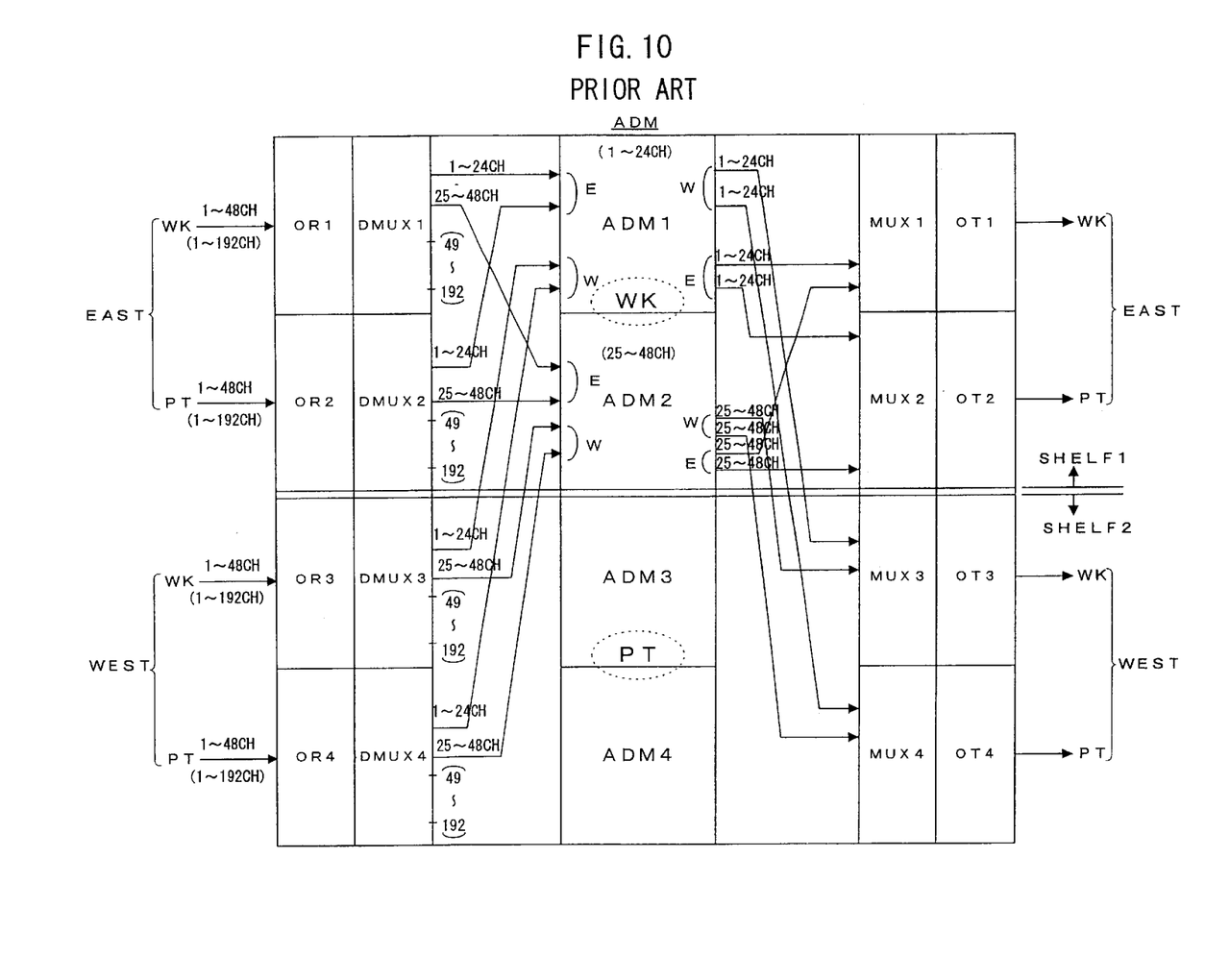
FIG. 10 is a block diagram showing a first prior art light transmission equipment (4F-BLSR)

A prior art arrangement (1) of each station (light transmission equipment) in such a light transmission system is shown in FIG. 10.

In this arrangement, a circuit board is divided into two, i.e. a SHELF1 for the work line and a SHELF2 for the protect line. In the circuit board SHELF1, as for the station C in FIG. 9 for instance, data are to be inputted from the work line (WK) and the protect line (PT) on the EAST side where the side of the station D is made the EAST (East side) and the side of the station B is made the WEST (West side). By a connection switch in the middle, the data are to be outputted to the work line (WK) and the protect line (PT) on the same EAST side.

This applies to the WEST side in the circuit board SHELF2. As a matter of course, by the connection switch, it is made possible to input the data from the work line (WK) and the protect line (PT) on the EAST side of the circuit board SHELF1 and to output the data to the work line (WK) and the protect line (PT) on the WEST side of the circuit board SHELF2. Conversely it is made possible to input the data from the work line (WK) and the protect line (PT) on the WEST side of the circuit board SHELF2 and to output the data to the work line (WK) and the protect line (PT) on the EAST side of the circuit board SHELF1.

To be more specific, the circuit board SHELF1 is provided with a receiving portion OR1 for the work line (WK) and a receiving portion OR2 for the protect line (PT), which are respectively connected to demultiplexing portions DMUX1 and DMUX2.

In addition, the circuit board SHELF2 is provided with receiving portions OR3 and OR4 for the work line (WK) and the protect line (PT) from the WEST side, which are respectively connected to demultiplexing portions DMUX3 and DMUX4.

Since each of the lines transmits the STS-48 data, 1–48CH data flow through a single optical fiber, while at the demultiplexing portions DMUX1–4 the data are divided into data of 24 channels (hereinafter occasionally abbreviated as CH's) to be bundled. Then, from the demultiplexing portion DMUX1 for instance, 1–24CH data are provided to the EAST side of an add/drop portion ADM1 which forms an add/drop portion ADM, and 1–24CH data from the demultiplexing portion DMUX2 are similarly provided to the EAST side of the add/drop portion ADM1.

Furthermore, 1–24CH data from the demultiplexing portion DMUX3 and 1–24CH data from the demultiplexing portion DMUX4 are inputted to the WEST side of the add/drop portion ADM1.

Also, at an add/drop portion ADM2, 25–48CH data from the demultiplexing portion DMUX1 and 25–48CH data from the demultiplexing portion DMUX2 are inputted to the EAST side, and 25–48CH data from the demultiplexing portion DMUX3 and 25–48CH data from the demultiplexing portion DMUX4 are inputted to the WEST side.

It is to be noted that add/drop portions ADM3 and ADM4 are provided as physical spare add/drop portions for the above-mentioned add/drop portions ADM1 and ADM2.

Also, the WEST side of the add/drop portion ADM1 outputs data bundles of 24CH's, one of which is provided to a multiplexing portion MUX3 of the circuit board SHELF2 and the other of which is provided to a multiplexing portion MUX4 of same.

Furthermore, the EAST side of the add/drop portion ADM1 outputs data bundles of 24CH's, one of which is provided to a multiplexing portion MUX1 of the circuit board SHELF1 and the other of which is provided to a multiplexing portion MUX2 of same.

At the add/drop portion ADM2, the output data on the WEST side are divided into data bundles of 25–48CH, one of which is provided to the multiplexing portion MUX3 and the other of which is provided to the multiplexing portion MUX4. Furthermore, one of the 25–48CH output data on the EAST side are provided to the multiplexing portion MUX1, and the other of the 25–48CH output data are provided to the multiplexing portion MUX2.

Then, the data of the multiplexing portions MUX1–4 respectively pass through transmitting portions OT1–OT4 to be outputted to the work line (WK) and the protect lines (PT) on the EAST and the WEST side.

Figure 11:
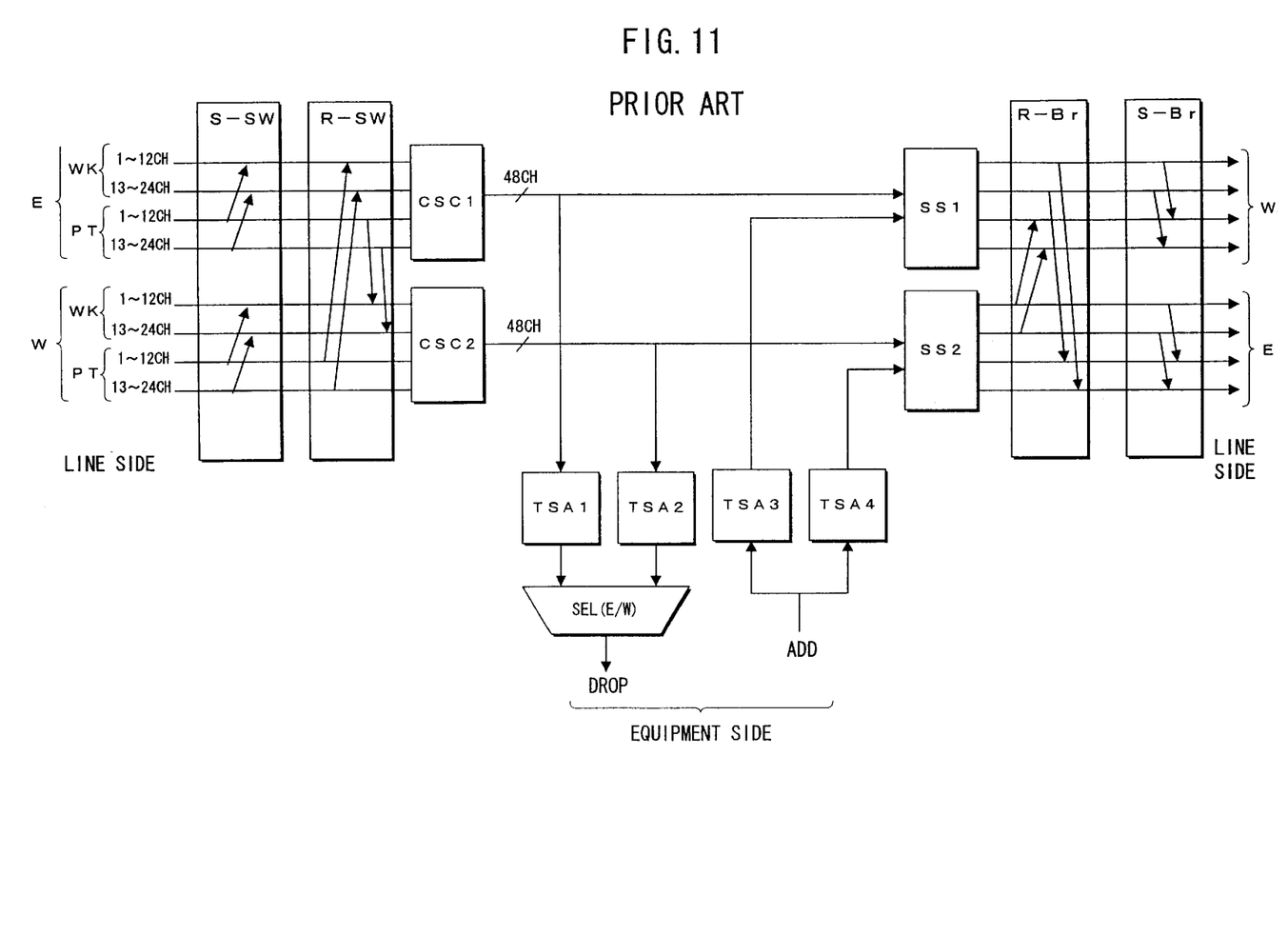
FIG. 11 is a block diagram showing a prior art add/drop portion used for a conventional light transmission equipment.

A prior art arrangement of each add/drop portion ADM is shown in FIG. 11, in which line data on the EAST and the WEST side are provided to a span switch S-SW with 24CH data being divided into data bundles of 12CH's on the work line and the protect line.

The span switch S-SW, as shown in FIG. 11, switches over the work line (WK) and the protect line (PT) based on a control signal (not shown), and a ring switch R-SW is provided next to the span switch S-SW to perform the switching operation opposite to the span switch S-SW.

The data which pass through the ring switch R-SW are provided to clock change circuits CSC1 and CSC2, in which a clock change from a line side to an equipment side is performed to output the data of 48CH's.

The output data of the clock change circuits CSC1 and CSC2 are provided to a selector SEL through time slot assignment portions TSA1 and TSA2, where the data on either the EAST or the WEST side are to be dropped or branched to the equipment side.

In addition, the data from the equipment side are provided to service selectors SS1 and SS2 through time slot assignment portions TSA3 and TSA4. The 48CH data from the clock change circuits CSC1 and CSC2 are also provided to the service selectors SS1 and SS2.

Accordingly, either the line side or the equipment side is preliminarily selected, whereby the data divided into the data bundles of 12CH's are sent to a ring bridge circuit R-Br. After performing the switching operation just opposite to the ring switch R-SW at the ring bridge circuit R-Br, the switching operation just opposite to the span switch S-SW is performed at a span bridge circuit S-Br, so that the data bundles of 12CH's are respectively outputted as the line data on the WEST and the EAST side.

The above-mentioned example refers to the case where the 48CH (2.4 Gb/s) data are transmitted through a single optical fiber, while the case where STS-192 data are transmitted can be similarly considered as shown by parentheses in FIG. 10.

In this case, however, since 1–192CH data are divided at the demultiplexing portions DMUX1–DMUX4, not two but eight add/drop portions ADM are required for each circuit board. Also in this case, each of the add/drop portions has the arrangement shown in FIG. 11.

Figure 12:
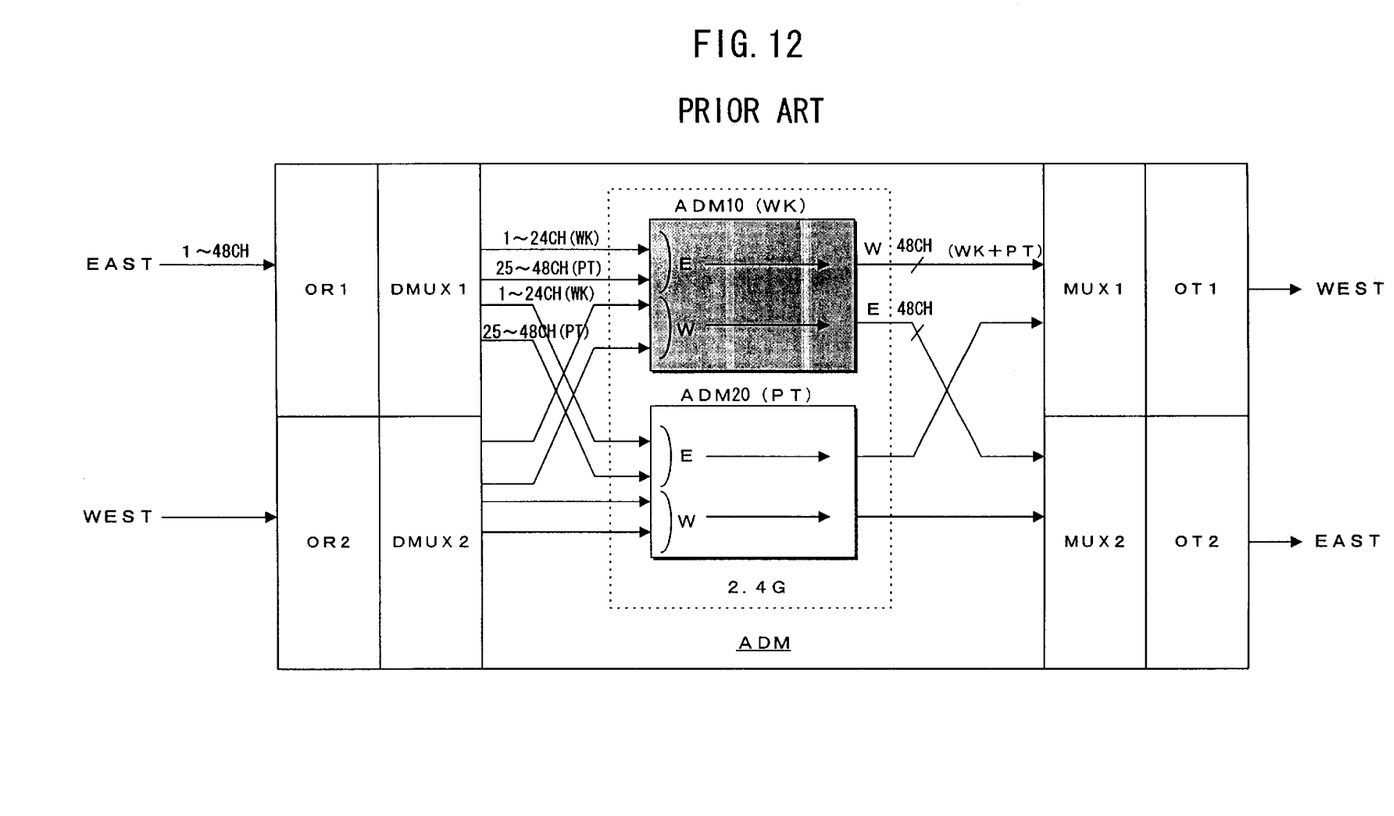
FIG. 12 is a block diagram showing a second prior art light transmission equipment (2F-BLSR:2.4 Gb/s)

While the four optical fibers are used in the above-mentioned example, the case where two optical fibers (2F-BLSR) are used can be similarly considered as shown in FIG. 12.

Namely, the 48CH data from the EAST side are divided into data bundles of 24CH's through the receiving portion OR1 and the demultiplexing portion DMUX1, so that at an add/drop portion ADM10 the 24CH data are inputted to both of the EAST and the WEST side for the work line and the protect line in the same way as the add/drop portion ADM1 shown in FIG. 10.

It is to be noted that an add/drop portion ADM20 is prepared for a physical spare in the same way as the add/drop portions ADM3 and ADM4 shown in FIG. 10, and the same data as the add/drop portion ADM10 are to be inputted and outputted.

When the STS-192 data are flowed as mentioned above in the light transmission system using such two optical fibers, a half of the 192CH's, i.e. 1–96CH are assigned to the work line (WK) and 97–192CH are assigned to the protect line (PT).

Figure 13:
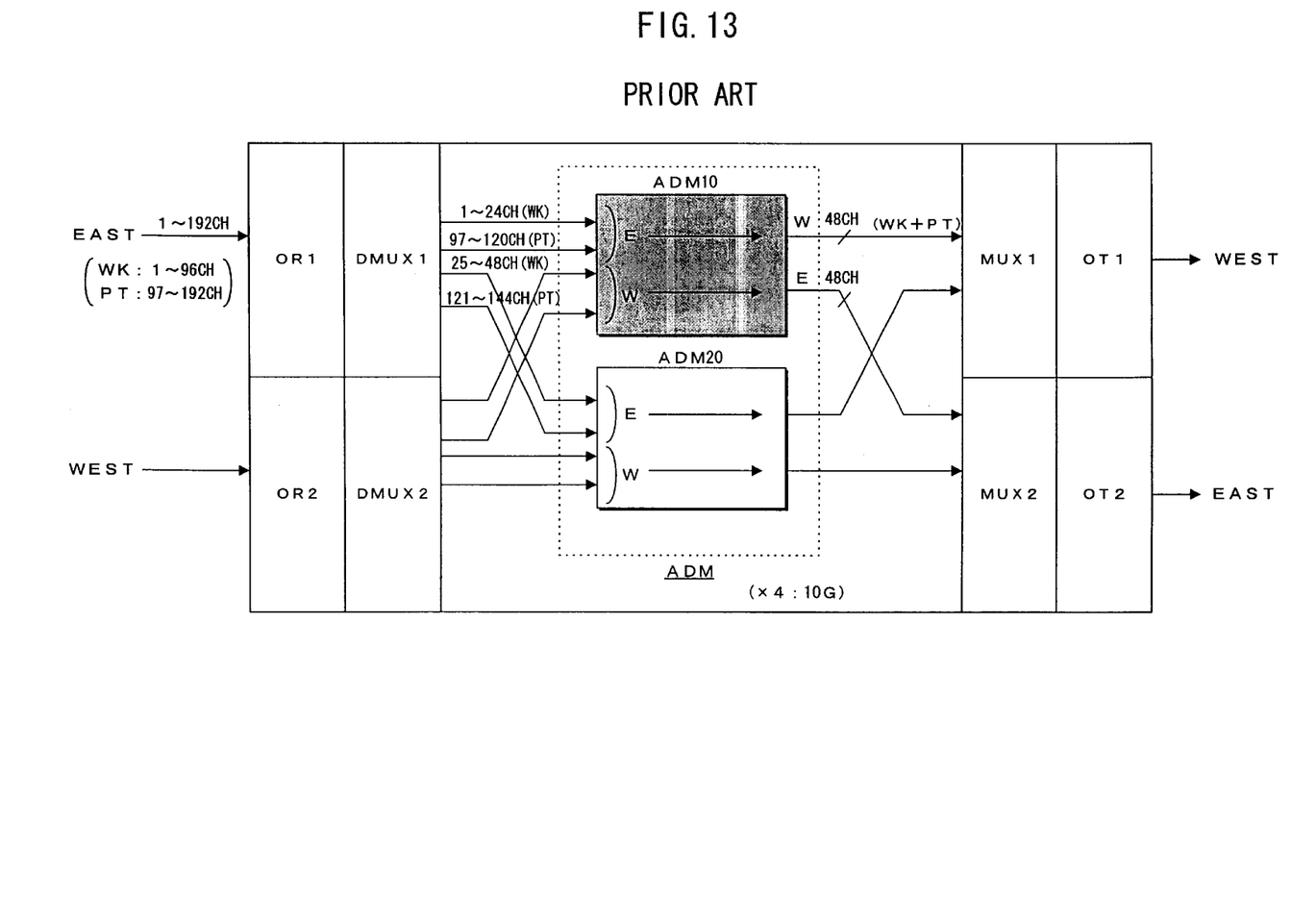
FIG. 13 is a block diagram showing a third prior art light transmission equipment (2F-BLSR:10 Gb/s).

For this reason, as shown in FIG. 13, with regard to the 24CH data demultiplexed by and outputted from the demultiplexing portion DMUX1, the data of 1–24CH are provided to the EAST side of the add/drop portion ADM10 for the work line, the data of 97–120CH are inputted to the EAST side for the protect line, the data of 25–48CH are provided to the EAST side of the add/drop portion ADM20 as the work data, and the data of 121–144CH are similarly provided to the EAST side as the protect data.

Finally, the ADM10 and ADM20 are to be provided by eight in all including those for the work line and for the protect line.

Also in such a 2-fiber system, the add/drop portion ADM shown in FIG. 11 adds or drops the data every 12CH and outputs them again to the line.

At the above-mentioned add/drop portion ADM in each of the light transmission systems, as shown in FIG. 11, each of the 24CH data is separately processed at the clock change circuits CSC1 and CSC2 as mentioned above. Since this process is based on the concatenation standard per STS-12C, there is no problem.

Namely, although a synchronous processing appears to be performed to the STS-48 data at a time, actually a data processing has been performed at a transmission rate (600 Mb/s) by the STS-12 standard.

Thus, there has been a problem that even the STS-48 data cannot be treated as concatenation standard signals of STS-48C so that a processing rate is suppressed to the transmission rate of the STS-12C.

SUMMARY OF THE INVENTION

It is accordingly an object of the present invention to provide a light transmission equipment, especially a clock change circuit, which can generate a desired concatenation signal from the maximum concatenation signal standardized in a synchronous transmission mode.

(1) In order to achieve the above-mentioned object, a light transmission equipment according to the present invention, comprising; a master and a slave circuit for clock change respectively inputting at least first and second line data based on a maximum transmission rate prescribed in a concatenation standard of a synchronous transmission mode obtained by dividing a desired transmission rate not prescribed in the concatenation standard, the clock change of the slave circuit being controlled whereby in-equipment data of the desired transmission rate is formed at both output data of the master and the slave circuit based on control information from the master circuit.

Namely, in the present invention, as the line data respectively inputted to the master and the slave circuit for the clock change, the data of the maximum transmission rate prescribed in the concatenation standard of the synchronous transmission mode obtained by dividing the desired transmission rate not prescribed in the concatenation standard are used.

The master circuit provides the control information for the synchronization of the clock change operation to the slave circuit whereby both output data of at least the master circuit and the slave circuit can produce the in-equipment data of the desired transmission rate not prescribed in the concatenation standard as the concatenation signal.

(2) The desired transmission rate may comprise STS-48. As the first and the second line data, data for 24 channels bundled with data of STS-12C (concatenation) standard may be respectively used.

Namely, only the standards up to the STS-12C (concatenation) standard are admitted at present. However, if the data of the STS-12C (concatenation) standard are bundled to perform a mutual concatenation, it becomes substantially equivalent to that STS-48C (concatenation) has been realized.

(3) Also, the above-mentioned master and slave circuits may respectively include pointer processors, and the pointer processor of the master circuit may assign the control information to that of the slave circuit.

Namely in the present invention, the pointer processor of the master circuit assigns the above-mentioned control information to the pointer processor of the slave circuit, so that the slave circuit can calculate a write address/read address based on the control information to perform a stuff control for the clock change.

(4) Also, the above-mentioned control information may include a pointer value and a write address on a line side, as well as stuff information and a read address on an equipment side.

(5) Furthermore, the above-mentioned master circuit may have a circuit for performing a parallel/serial conversion to the control information, and the slave circuit may have a circuit for performing a serial/parallel conversion to the control information.

Thus, it becomes possible to transfer various control information with a single signal line.

(6) Furthermore, the above-mentioned master circuit may have a circuit for performing a parity calculation to the control information, and the slave circuit may have a circuit for performing a parity check to the control information.

Thus, even if data multiplexed by a single signal line have much information, the transfer can be guaranteed by performing the parity calculation to the monitor.

(7) Furthermore, the above-mentioned slave circuit may have a circuit for delaying the second line data only for a time required for transferring the control information from the master circuit to the slave circuit, and the master circuit may have a circuit for delaying output data only for a time lag between the output data of the master circuit and the slave circuit.

Namely, since a predetermined time interval is required to transfer the control information, it is preferable to delay the data for the time and match the timings of the output data between the master and the slave circuit.

BRIEF DESCRIPTION OF THE DRAWINGS

Throughout the figures, like reference numerals indicate like or corresponding components.

DESCRIPTION OF THE EMBODIMENTS

Figure 1:
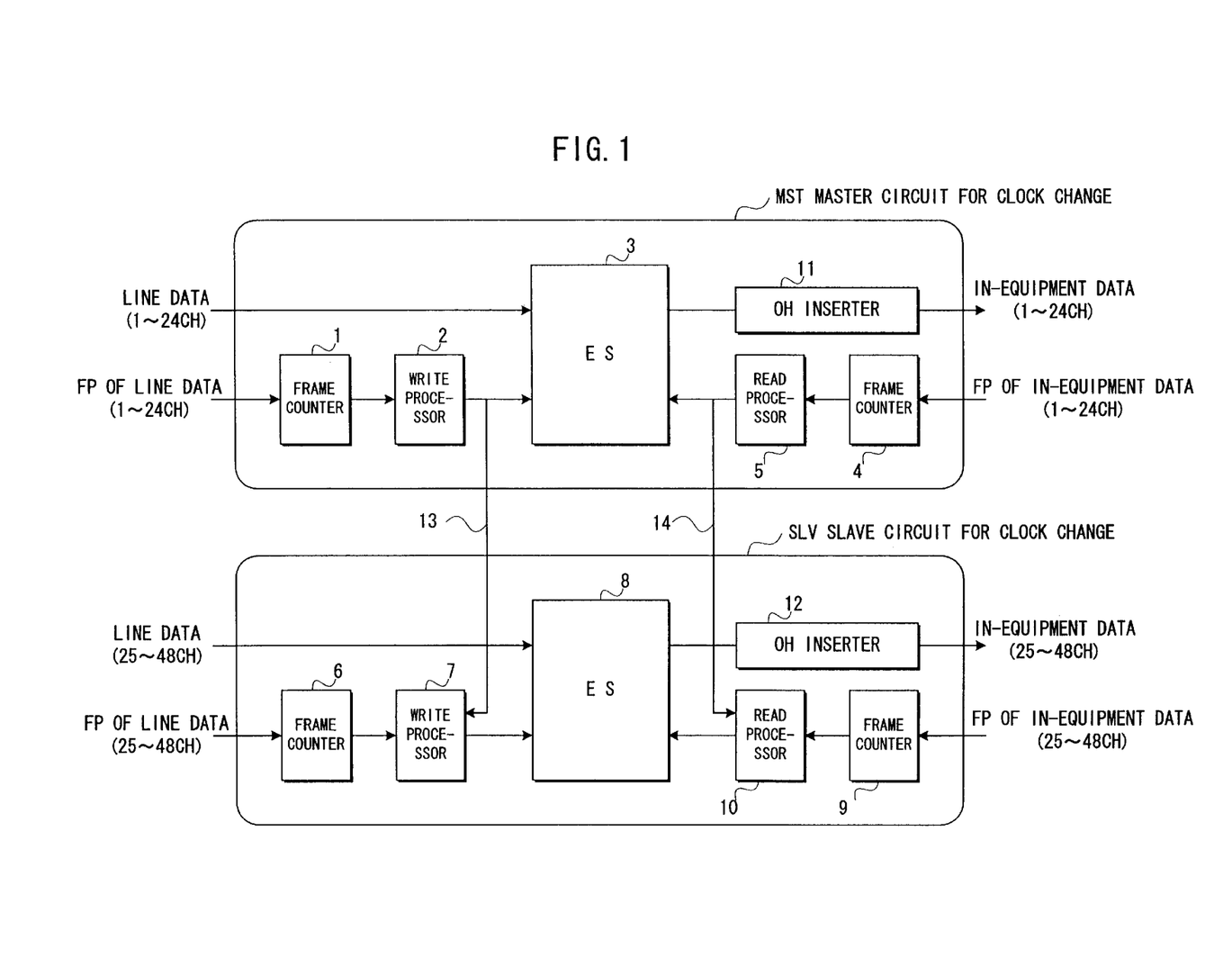
FIG. 1 is a block diagram showing an embodiment (1) of a clock change circuit used for a light transmission equipment according to the present invention.

FIG. 1 shows an embodiment (1) of a clock change circuit in a light transmission equipment according to the present invention, which is composed of a master circuit MST and a slave circuit SLV.

The clock change circuit is equivalent to the clock change circuit CSC1 or CSC2 shown in each add/drop portion (see FIG. 11) which forms the add/drop portion ADM shown from FIGS. 10 to 13.

Furthermore, taking FIG. 10 as an example, the master circuit MST is provided in the add/drop portion ADM1 to input 1–24CH data on the EAST side, and the slave circuit SLV is provided in the add/drop portion ADM2 to input 1–24CH data on the EAST side.

In this embodiment, the master circuit MST is composed of a frame counter 1 for 1–24CH data on the line side, a write processor 2 for receiving a count of the frame counter 1 to generate a write address, an elastic store (ES) 3 for receiving the write address from the write processor 2 to store 1–24CH line data, a frame counter 4 for 1–24CH data on the equipment side, a read processor 5 for generating a read address of the elastic store 3 based on a count of the frame counter 4, and an overhead (OH) inserter 11 for inserting an OH into the data read out of the elastic store 3.

Also, in the slave circuit SLV, a frame counter 6, a write processor 7, an elastic store 8, a frame counter 9, a read processor 10, and an OH inserter 12 are provided respectively corresponding to the frame counter 1, the write processor 2, the elastic store 3, the frame counter 4, the read processor 5, and the OH inserter 11 above-mentioned.

Additionally, control information for the clock change is sent from the master circuit MST to the slave circuit SLV. As the control information, a write address 13 of head data in the payload (see FIG. 8) excluding the overhead portion of 1–24CH line data frame is provided to the write processor 7 of the slave circuit SLV from the write processor 2 of the master circuit MST, and a read address 14 of the head data in the payload is provided to the read processor 10 from the read processor 5.

In the operation of this embodiment, the line data on the 1–24CH side provided to e.g. the add/drop portion ADM1 shown in FIG. 10 from the demultiplexing portion DMUX1 and a frame pulse FP accompanied thereby are firstly inputted to the master circuit MST.

Based on the frame pulse (FP), the frame counter 1 is started. The frame counter 1 provides a timing signal indicating the payload of the 1–24CH line data to the write processor 2.

At the write processor 2, the write address and a write enable signal are generated based on the timing signal to be provided to the elastic store 3.

On the other hand, the frame counter 4 is started by the frame pulse FP accompanied by in-equipment frame data for 1–24CH, so that a timing signal indicating the payload of the in-equipment data for 1–24CH is outputted to the read processor 5 from the frame counter 4. At the read processor 5, the read address and a read enable signal to the elastic store 3 are generated based on the timing signal.

An overhead is added to the data read from the elastic store 3 by the OH inserter 11 to be sent to the time slot assignment portion and the service selector as shown in FIG. 11.

In parallel with a series of operations, the write processor 2 outputs the head write address 13 of the payload in the 1–24CH line data frame to the write processor 7 in the slave circuit SLV, and the read processor 5 outputs the head read address 14 of the payload in the in-equipment data frame to the read processor 10 in the slave circuit SLV.

On the other hand, the slave circuit SLV inputs 25–48CH line data provided to e.g. the add/drop portion ADM2 shown in FIG. 10 from the demultiplexing portion DMUX1 and the frame pulse FP thereof.

The slave circuit SLV starts to operate the frame counter 6 based on the frame pulse FP in the same way as the master circuit MST, and generates the timing signal indicating the payload of the 25–48CH line data at the frame counter 6 to output the same to the write processor 7.

At the write processor 7, based on the timing signal the write address and the write enable signal for writing 25–48CH line data are generated to be provided to the elastic store 8.

At this time, the write processor 7 simultaneously performs to make the write address of the head data in the payload coincide with the write address 13 provided from the write processor 2 of the master circuit MST.

Also, the frame counter 9 is started by the in-equipment frame pulse FP for 25–48CH, so that the timing signal indicating the timing of the in-equipment frame is provided to the read processor 10.

At the read processor 10, based on the timing signal the read address and the read enable signal of the elastic store 8 are generated. At this time, the read processor 10 also performs to make the read address of the head data in the payload coincide with the read address 14 received from the master circuit MST.

The data read from the elastic store 8, to which the overhead is added to at the OH inserter 12, are taken in the equipment.

Figure 2:
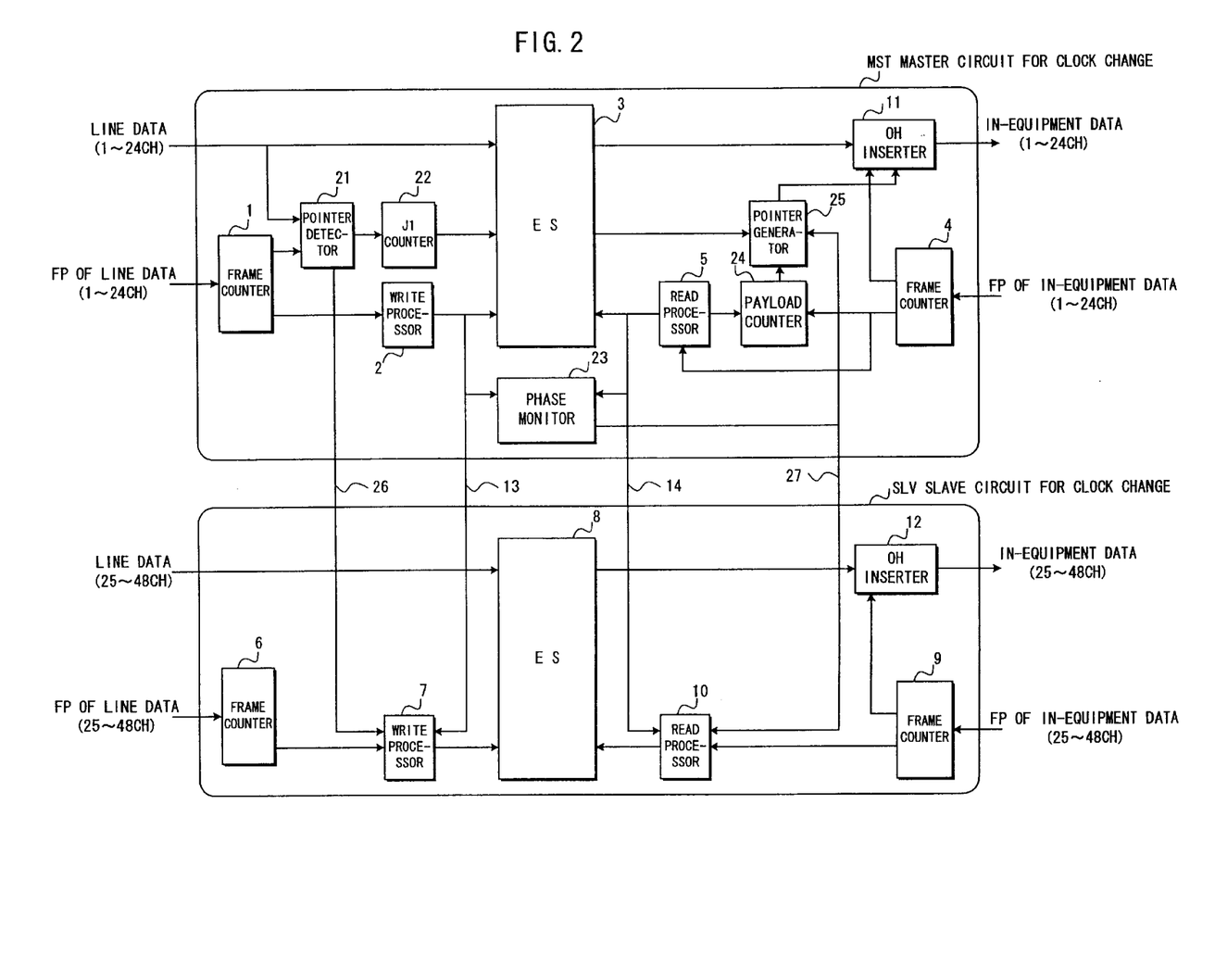
FIG. 2 is a block diagram showing an embodiment (2) of a clock change circuit used for a light transmission equipment according to the present invention.

FIG. 2 shows an embodiment (2) of the clock change circuit used for the light transmission equipment according to the present invention.

This embodiment, different from the embodiment (1) shown in FIG. 1, is provided with a pointer detector 21 for inputting the 1–24CH line data and the count of the frame counter 1 and detecting a pointer value (stuff byte), a J1 counter 22 forming a pointer processor with the pointer detector 21 to detect a J1 byte based on the detected pointer value and to provide the detected value to the elastic store 5, a phase monitor 23 for comparing the address of the write processor 2 with that of the read processor 5, a payload counter 24 for inputting the timing signal from the frame counter 4, the read address from the read processor 5, and the like to count the payload of the in-equipment frame, and a pointer generator 25 for providing the pointer value indicating the location of the J1 byte of the in-equipment frame based on the payload count provided from the payload counter 24, a phase comparison result from the phase monitor 23, and the J1 byte detected value from the elastic store 5 to the OH inserter 11.

Furthermore the slave circuit SLV has the control information, in addition to the above-mentioned address signals 13 and 14, a receiving pointer value 26 (including stuff information) detected at the pointer detector 21 and provided to the write processor 7, and transmitting stuff information 27 outputted from the phase monitor 23 and provided to the read processor 10.

As a characteristic operation of this embodiment, the frame counter 1 in the master circuit MST is firstly started based on the frame pulse FP of 1–24CH, so that the pointer detector 21 detects a J1 byte pointer value, including stuff information i.e. positive/negative stuff, from H1 and H2 bytes (see FIG. 8) of the 1–24CH line data to be outputted to the J1 counter 22 and the write processor 7 as the control information.

The J1 counter 22 detects the J1 byte based on the pointer value including stuff information, and a J1 byte display bit as the detected value is written in the elastic store 3.

Also, when the frame counter 4 is started by the in-equipment frame pulse FP, the signal indicating the payload of the in-equipment frame outputted from the frame counter 4 is provided to the payload counter 24 and the read processor 5.

Thus, the payload counter 24 assumes an enable state to operate the counter, and the read processor 5 generates the read address and the read enable signal to be provided to the elastic store 3.

In addition, the pointer generator 25 which has received the stuff information 27 outputted from the phase monitor 23 generates a transmission pointer value based on the count of the payload counter 24 when the J1 byte display bit is read from the elastic store 3 and the stuff information from the phase monitor 23 to be provided to the overhead inserter 11.

The overhead inserter 11 adds the overhead including the pointer value to the data read from the elastic store 3 to output the same as the 11–24CH data to the equipment.

In parallel with a series of operations, like the embodiment (1), the address information 13 and 14 are provided to the slave circuit SLV from the master circuit MST to perform the address coincidence, and a stuff (write enable) control at the writer processor 7 is simultaneously performed by providing the receiving pointer value (and the stuff information) 26 detected at the pointer detector 21 to the write processor 7.

Furthermore, at the read processor 10 in the slave circuit SLV, the stuff (read enable) control is simultaneously performed by the transmitting stuff information 27 provided from the phase monitor 23, so that the overhead is added to the data read from the elastic store 8 at the overhead inserter 12 to be outputted to the equipment.

Figure 3:
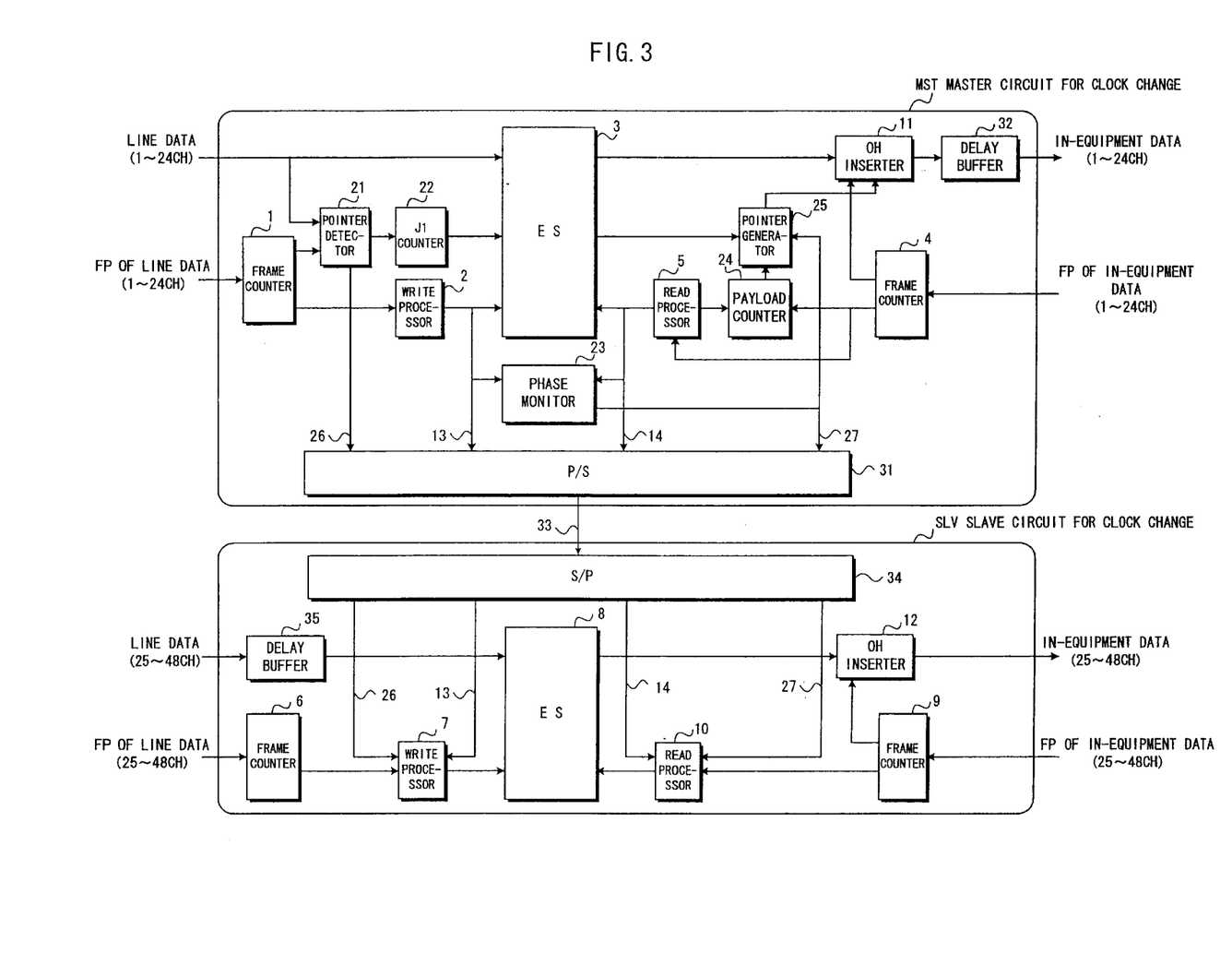
FIG. 3 is a block diagram showing an embodiment (3) of a clock change circuit used for a light transmission equipment according to the present invention.

FIG. 3 shows an embodiment (3) of the clock change circuit used for the light transmission equipment according to the present invention.

While in the embodiment (2) shown in FIG. 2, the control information 13, 14, 26, and 27 are provided to the slave circuit SLV from the master circuit MST as parallel signals, in the embodiment (3) such control information is once converted into a serial signal 33 at a parallel/serial conversion circuit 31 to be provided to the slave circuit SLV. Then, the serial signal 33 is restored to the parallel signal at a serial/parallel conversion circuit 34 to perform the same operation control as the above-mentioned embodiment (2).

However, it is necessary to delay the time for transferring the serial signal 33 from a conversion circuit 27 to the conversion circuit 34, the time for conversion at the conversion circuits 31 and 34, and the time required for transferring the control information until write processing is performed at the write processor 7.

For this reason, a delay buffer 35 is provided for delaying the line data of 25–48CH for a predetermined time interval.

Since the in-equipment data outputted from the master circuit MST is made faster by the delay time at the delay buffer 35, it is required to delay the in-equipment data, so that a delay buffer 32 is provided on the output side of the OH inserter 11.

Figure 4:
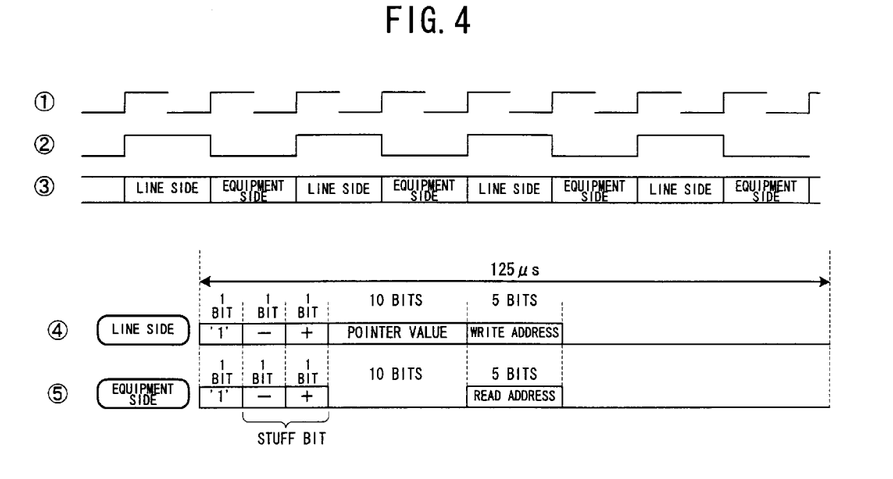
FIG. 4 is a time chart of the embodiment (3) of a light transmission equipment according to the present invention.

A time chart of the embodiment (3) is shown in FIG. 4, in which ① and ② respectively show a transferring clock and a timing pulse of serial data 33, and ③ shows the serial data 33. The serial data ③ is divided into two time slots, which are respectively assigned to the control information on the line side as well as the equipment side.

The respective control information (data) are inserted into formats ④ and ⑤ at each time slot. It is to be noted that since the control information ④ on the line side and the control information ⑤ on the equipment side are asynchronous, entirely different data are to be inserted between adjoining time slots.

For instance, it is seen that "1" (header) on the equipment side is inserted at the time slot adjoining to the time slot at which "–" (negative stuff) on the line side is inserted.

Figure 5:
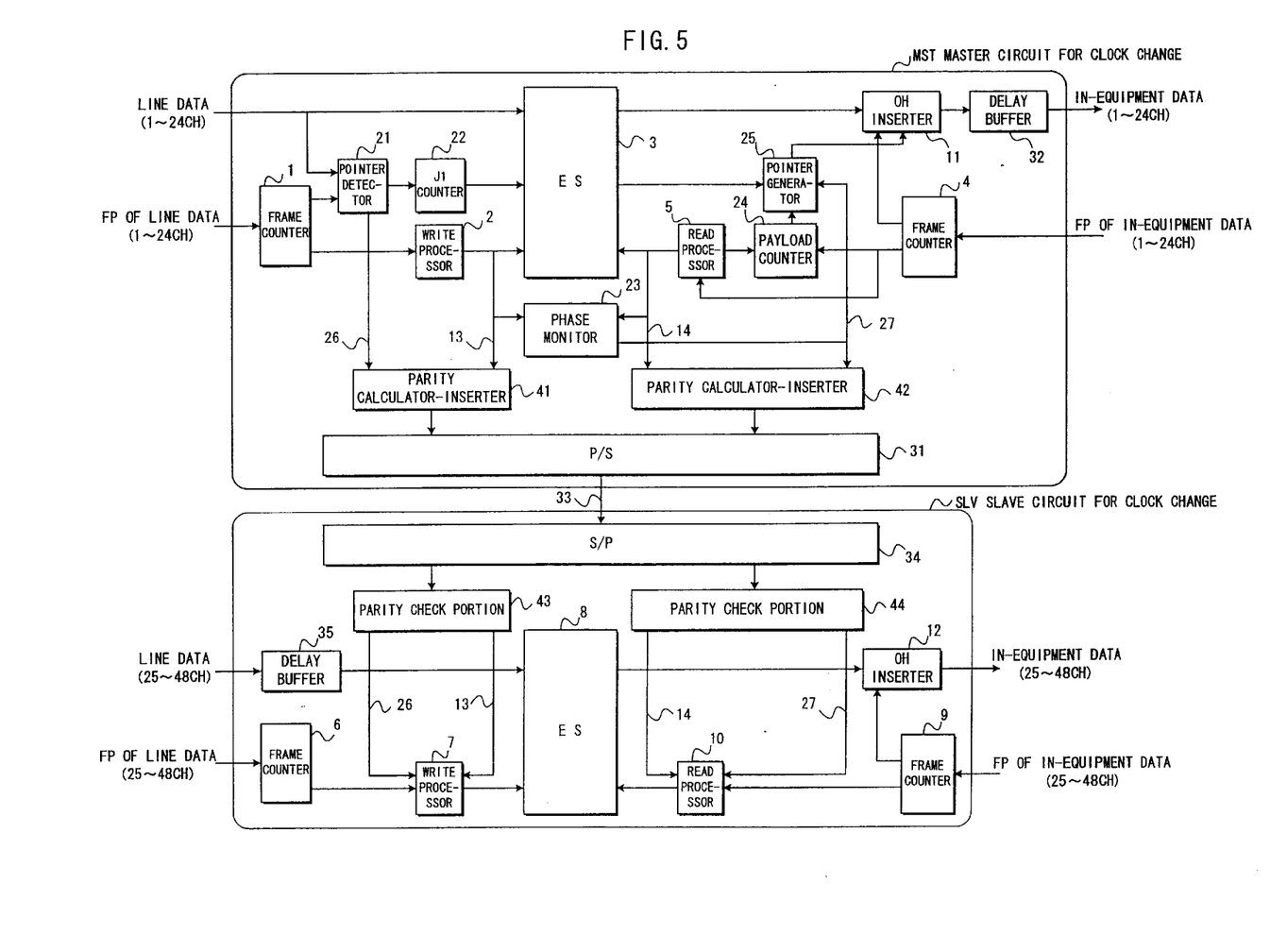
FIG. 5 is a block diagram showing an embodiment (4) of a clock change circuit used for a light transmission equipment according to the present invention.

FIG. 5 shows an embodiment (4) of the clock change circuit used for the light transmission equipment according to the present invention. In this embodiment, besides the embodiment (3) shown in FIG. 3, a parity calculator-inserter 41 for the control information 26 and 13 and a parity calculator-inserter 42 for the control information 14 and 27 are provided in the master circuit MST. Corresponding to the portions 41 and 42 a parity check portion 43 for performing a parity check to the control information 26 and 13 outputted from the serial/parallel conversion circuit 34 and a parity check portion 44 for performing a parity check to the control information 14 and 27 are provided in the slave circuit SLV.

Namely, at the parity calculator-inserter 41 in the master circuit MST, the parity calculation is performed to the pointer information (stuff information) and the write address information, and at the parity calculator-inserter 42, the parity calculation is performed to the read address information and the stuff information.

At the parity check portion 43 in the slave circuit SLV, the parity check is performed to the pointer information (and the stuff information) and the write address information. At the parity check portion 44, the parity check is performed to the read address information and the stuff information to protect the data.

Figure 6:
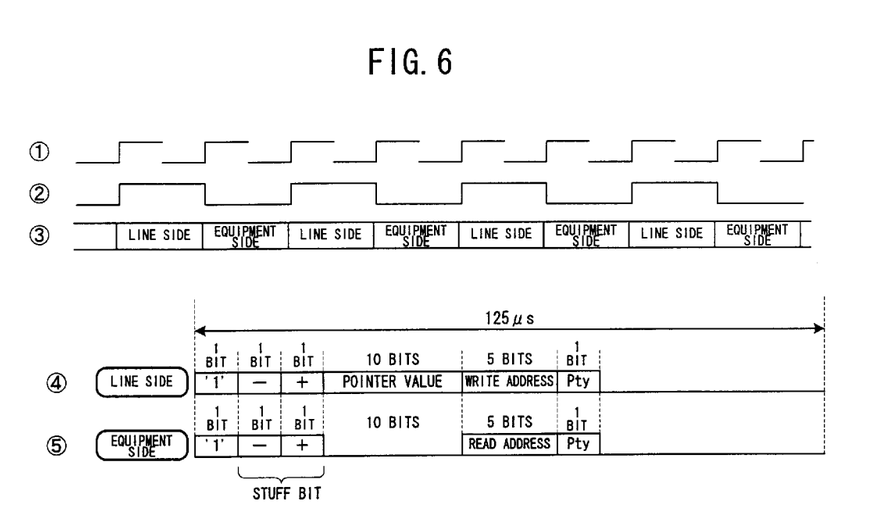
FIG. 6 is a time chart of the embodiment (4) of a light transmission equipment according to the present invention.

A time chart in this embodiment (4) is shown in FIG. 6. Compared with the time chart in FIG. 4, it is different that a bit (Pty) located at the end of the control information ④ on the line side and the control information ⑤ on the equipment side is a parity bit for data guarantee. The other contents of ①–⑤ are similar to the contents of the time chart in the embodiment (3).

Figure 7:
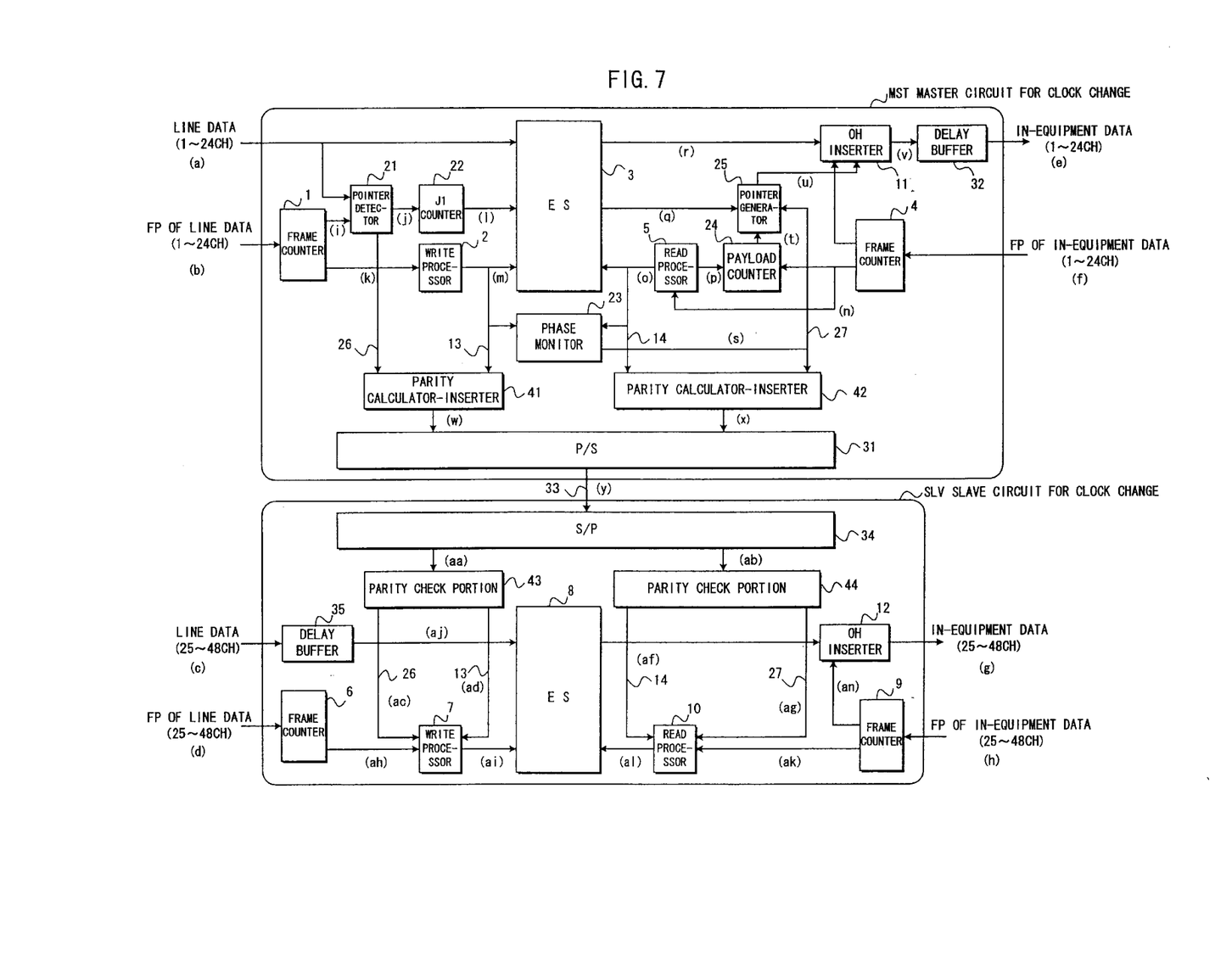
FIG. 7 is a block diagram showing an embodiment (5) of a clock change circuit used for a light transmission equipment according to the present invention.

FIG. 7 shows an embodiment (5) of the clock change circuit used for the light transmission equipment according to the present invention, which is substantially equal to the embodiment (4) shown in FIG. 5. However in this embodiment, the operations of the abovementioned embodiments (1)–(4) are illustrated by signals of the portions.

It is to be noted that the line data and the in-equipment data used here have the STS-48 data frame format shown in FIG. 8, and the STS-48 data are divided into two data bundles of 24CH's (12CH's×2) to be respectively accommodated in the master circuit MST and the slave circuit SLV. Also, only the data received by the master circuit MST are assumed to include the J1 byte indicating the head of the payload data (SPE) of the STS-48.

Write Operation on Master Side

In each of the master circuit MST and the slave circuit SLV, the frame counters 1 and 6 are operated by frame signals (b) and (d) of the line data respectively synchronized with 1–24CH data (a) and 25–48CH data (c) inputted from the line side.

The line data (a) and (c) are supposed to be processed with 8 bits being made a single byte. Similarly, data (e) and (g) from the equipment side and frame pulse signals (f) and (h) accompanied by the data are inputted.

In the master circuit MST, a pointer (H1/H2 byte) detection timing signal (i) and a timing signal (k) for data write of the elastic memory 3 are generated by the frame counter 1.

At the pointer detector 21, a pointer value (j) is detected from the line data (a) and the pointer detection timing signal (i) to be provided to the J1 counter 22. The pointer value is a variable indicating the head position of the payload, indicating the J1 value located at the head of the payload in the frame format shown in FIG. 8, and including received stuff information. The reference position is the next byte to H3 byte of the LOH with the pointer value being set to "0". The pointer value can have a value up to the maximum "783".

The J1 counter 22 is operated by using the pointer value (j) to recognize the location of the J1 byte, and write a flag signal (l) indicating the recognized J1 byte in the elastic memory 3 at the timing of the data (a) inputted from the line. The flag signal (1) writes "1" at a J1 byte position.

It is to be noted that the write process to the elastic memory 3 is performed by the write processor 2 generating a write address (m) and a write control signal by using the timing signal (k). The contents to be written are composed of 8 bits of the line data (a) and a single bit of the J1 byte flag (1), i.e. 9 bits in total. The write control signal comprises the write address (m), and the write enable signal, and the like.

Read Operation on Master Side

The frame counter 4 is operated, which generates the frame timing outputted to the equipment side by the frame pulse signal (f) of the data from the equipment. By using a read timing signal (n) generated at the frame counter 4, a read address (o) and a read control signal for reading the data from the elastic store 3 are outputted from the read processor 5.

The data read are composed of 8 bits data (r) and a single bit J1byte flag (q), i.e. 9 bits in total.

By timing information (p) from the read processor 5 and the read timing signal (n) from the frame counter 4, the payload counter 24 is operated, which generates the timing of the payload portion in the in-equipment data frame.

By using the count of the payload counter 24 and the J1 byte flag (q) read from the elastic store 3, a pointer (u) to be inserted into the in-equipment data is generated, so that the overhead information including the data (r) read from the elastic store 3 and the pointer information (u) is multiplexed at the OH inserter 11 to be outputted as data (v).

However in this case, as mentioned in the above embodiment, the data (e) delayed at the delay buffer 32 for a predetermined time interval are to be outputted.

When the read control is performed, at the phase monitor 23 which monitors the write timing in the elastic store 3 by the frame pulse (b) of the line data and the read timing by the frame pulse (f) of the in-equipment data, the accesses to the addresses of the elastic store 3 are monitored to perform a stuff processing.

Since the addresses collide with each other in case that the write side writes the data at e.g. address "0" at a certain time and the read side simultaneously reads the data at the address "0", the stuff processing serves for stopping the control on the read side or repeating the access to the previous address by the phase monitor 23.

Namely, the phase monitor 23 performs a stuff determination by using the write control signal (m) and the read control signal (o) to output a stuff signal (s) to the pointer generator 25, generating the pointer value to be included in the in-equipment data (e). Also, in order to transfer the stuff information to the slave circuit SLV, the stuff signal is inputted to the parity calculator-inserter 42.

Slave Interface Operation on Master Side

The pointer value (k) extracted from the line data (a) and the address counter value (m) at the J1 byte are provided to the parity calculator-inserter 41 and multiplexed into the form shown in the time chart of FIG. 6. The parity bit is generated by using the control information, so that control information data (w) into which the parity bit is inserted are provided to the parallel/serial conversion circuit 31.

On the read side, the read address (o) at the J1 byte access and the stuff information (s) by the phase monitor are similarly multiplexed at the parity calculator-inserter 42 as shown in the time chart of FIG. 6 to obtain control information data (x) where the parity bit is generated or inserted by using the data.

A parallel/serial conversion (from parallel to serial) is performed to the control information (w) on the write side, and to the control information (x) on the read side at the parallel/serial conversion circuit 31 to output serial control information thereof (y) to the slave circuit SLV.

Master Interface Operation on Slave Side

The serial control information (y) inputted from the master circuit MST is converted into parallel data at the serial/parallel conversion circuit 34 to be divided into write control information (aa) and read control information (ab) to the elastic store 8.

These separated data (aa) and (ab) are respectively inputted to the parity check portions 43 and 44, which perform the parity calculation with the parity bits (Pty) included in the data for detecting errors of the data.

As a result of the parity check, when an error is detected in the data, the parity check portions 43 and 44 respectively control the write processor 7 and the read processor 10 so as to abandon the data and invalidate the control with the data. Thus, the data transfer between the master circuit MST and the slave circuit SLV can be guaranteed The data (aa) which pass through the parity check portion 43 are divided into a receiving pointer value (ac) and a write address value (ad). Similarly, the data (ab) which pass through the parity check portion 44 are divided into a read address value (af) and stuff information (ag).

Write Operation on Slave Side

The frame counter 6 using the frame pulse (d) of the line data as a load signal is operated to generate a timing signal synchronized with the 25–48CH line data (c).

The write processor 7 performs the write control to the elastic store 8 by using the write address information (ad) from the master circuit MST as load data, and writes the data in the same state as the state (address value) in which the J1 byte is written in the master circuit MST.

At this time, besides the time required for multiplexing/demultiplexing the frame until the serial information (y) is transmitted from the master circuit MST to the slave circuit SLV, the processing time including the time required for converting the serial data to the parallel data is required.

For this reason, since a time lag occurs between the control information from the master circuit MST and the line data (c) to the slave circuit SLV, the control is performed so as to write data (aj) to which the delay is added at the delay buffer 35 for the line data (c) in the elastic store 8 by using a write control signal (ai) thereto from the write processor 7.

Read Operation on Slave Side

The frame counter 9 using the frame pulse (h) of the in-equipment data as the load signal is operated to generate timing signals (ak) and (an) for the in-equipment data.

The timing signal (ak) as well as the read address (af) and the stuff information (ag) transferred from the master circuit MST are provided to the read processor 10 to perform a data read from the elastic store 8.

Since the read address (af) indicates the position where the J1byte is written i.e. the head of the data in the master circuit MST, operating a read counter (not shown) based on the read address (af) enables the data synchronized between the master circuit MST and the slave circuit SLV to be read.

The read processor 10 generates a read control signal (al) to read the data from the elastic store 8. The overhead inserter 12 inserts the overhead into the read data with the timing from the frame counter 9 to output the same as the in-equipment data (g).

Data Output Operation on Master Side

Since the slave circuit SLV uses the delay buffer 35 for a control information transferring time between the master circuit and the slave circuit, the time lag caused by the delay buffer 35 necessarily occurs between the in-equipment data (e) outputted from the master circuit MST and the in-equipment data (g) outputted from the slave circuit SLV.

Therefore, the delay buffer 32 is provided to the master circuit MST in order to absorb the time lag, so that it becomes possible to completely synchronize the output data of the master circuit MST with those of the slave circuit SLV.

As described above, a light transmission equipment according to the present invention is arranged such that a master and a slave circuit for clock change are provided respectively inputting at least two data at a maximum transmission rate based on a concatenation standard of a synchronous transmission mode obtained by dividing a desired transmission rate not prescribed in the concatenation standard, and the slave circuit is controlled by control information from the master circuit side. Therefore, it becomes possible to realize STS-48C concatenation by the control information between the master circuit and the slave circuit, even though e.g. STS-48 data are divided into data bundles of 24CH's.

What we claim is:

1. A light transmission equipment comprising;
    a master and a slave circuit for clock change respectively inputting at least first and second line data based on a maximum transmission rate prescribed in a concatenation standard of a synchronous transmission mode obtained by dividing a desired transmission rate not prescribed in the concatenation standard, the clock change of the slave circuit being controlled by using control information used for the clock change in the master circuit, whereby in-equipment data of the desired transmission rate is formed with both output data of the master and the slave circuit.

2. The light transmission equipment as claimed in claim 1 wherein the desired transmission rate comprises STS-48, and the first and the second line data respectively comprise data for 24 channels bundled with data of STS-12 concatenation standard.

3. The light transmission equipment as claimed in claim 1 wherein the master and the slave circuit respectively include pointer processors, and the pointer processor of the master circuit transfers the control information to that of the slave circuit.

4. The light transmission equipment as claimed in claim 3 wherein the control information includes a pointer value and a write address on a line side, as well as stuff information and a read address on an equipment side.

5. The light transmission equipment as claimed in claim 4 wherein the master circuit has a parallel/serial conversion circuit for the control information, and the slave circuit has a serial/parallel conversion circuit for the control information from the parallel/serial conversion circuit.

6. The light transmission equipment as claimed in claim 5 wherein the master circuit has a parity calculation circuit for the control information, and the slave circuit has a parity check circuit for the control information from the parity calculation circuit.

7. The light transmission equipment as claimed in claim 6 wherein the slave circuit has a circuit for delaying the second line data only for a time required for transferring the control information from the master circuit to the slave circuit, and the master circuit has a circuit for delaying output data only for a time lag between the output data of the master circuit and the slave circuit.

* * * * *